United States Patent [19]

Tatsu et al.

[11] Patent Number: 5,225,504
[45] Date of Patent: Jul. 6, 1993

[54] PROCESS FOR PRODUCING PEROXIDE-VULCANIZABLE, FLUORINE-CONTAINING ELASTOMER

[75] Inventors: Haruyoshi Tatsu, Hitachi; Masashi Fukazawa, Shimizu; Yuichi Yamamoto, Takahagi, all of Japan

[73] Assignee: NOK Corporation, Tokyo, Japan

[21] Appl. No.: 986,580

[22] Filed: Dec. 7, 1992

[30] Foreign Application Priority Data

Feb. 14, 1992 [JP] Japan ................... 4-059596

[51] Int. Cl.$^5$ ............................... C08F 2/02
[52] U.S. Cl. ...................... 526/206; 526/247
[58] Field of Search ............ 526/238, 206, 247

[56] References Cited

U.S. PATENT DOCUMENTS

| | | |
|---|---|---|
| 4,748,223 | 5/1988 | Haruyoshi . |
| 4,943,622 | 7/1990 | Naraki . |
| 4,948,852 | 8/1990 | Moore ................... 526/206 |
| 4,973,633 | 11/1990 | Moore ................... 526/206 |
| 4,973,634 | 11/1990 | Logothetis ............ 526/206 |
| 5,032,655 | 7/1991 | Moore ................... 526/206 |
| 5,151,492 | 9/1992 | Abe . |

FOREIGN PATENT DOCUMENTS

| | | | |
|---|---|---|---|
| 0027721 | 4/1981 | European Pat. Off. | ............ 526/206 |
| 60-221409 | 11/1985 | Japan | ................... 526/206 |

Primary Examiner—Joseph L. Schofer
Assistant Examiner—N. Sarofim
Attorney, Agent, or Firm—Lowe, Price, LeBlanc & Becker

[57] ABSTRACT

A fluorine-containing elastomer capable of giving a primary vulcanization product with a good permanent set through peroxide vulcanization is produced by homopolymerization or copolymerization of a fluorine-containing olefin having 2 to 8 carbon atoms in the presence of an iodine and bromine-containing compound represented by the general formula $RBr_nI_m$, wherein R represents a fluorohydrocarbon group, a chlorofluorohydrocarbon group, a chlorohydrocarbon group or a hydrocarbon group, and n and m each are integers of 1 and 2, and a small amount of perfluoro(vinylether) compound having a general formula of $CF_2=CFO[CF_2CF(CF_3)O]_m(CF_2)_nX$, wherein X is a bromine atom or an iodine atom and m and n each are 1, 2 or 3.

4 Claims, No Drawings

PROCESS FOR PRODUCING PEROXIDE-VULCANIZABLE, FLUORINE-CONTAINING ELASTOMER

BACKGROUND OF THE INVENTION

1. Field of the Invention

This invention relates to a process for producing a peroxide-vulcanizable, fluorine-containing elastomer, and more particularly to a process for producing a fluorine-containing elastomer having those halogen atoms in the molecule which can act as cross-linking points for peroxide vulcanization.

2. Description of the Prior Art

Generally, vulcanized fluorine-containing elastomers have distinguished heat resistance, solvent resistance, weathering and ozone resistances, creep resistance, etc., and are commercially widely used as a sealing material for oil seal, packing material, gasket, O ring, etc., or as a diaphragm material, a hose lining material, a coating material, an adhesive, etc.

One of the conventional processes for obtaining such a vulcanized, fluorine-containing elastomer is based on a peroxide vulcanization method using an organic peroxide as a vulcanizing agent, where fluorine-containing elastomers having iodine atoms or bromine atoms as cross-linking points are used. Some of the examples will be given below, and they have the following problems.

Japanese Patent Application Kokai (Laid-open) No. 53-125,491 discloses a process using an iodine compound represented by the general formula RfIx, wherein Rf represents a fluorohydrocarbon group or a chlorofluorohydrocarbon group, but this iodine compound is expensive and highly toxic and readily liberates the iodine atoms bonded to the fluorine-containing elastomer, when exposed to light, as disclosed in the following Japanese Patent Application Kokai (Laid-open) No. 60-221,409.

Japanese Patent Application Kokai (Laid-open) No. 60-221,409, discloses a process using an iodine compound represented by the general formula $RI_{1-2}$, wherein R represents a hydrocarbon group having 1 to 3 carbon atoms, and this iodine compound is cheap and less toxic than the said compound represented by RfIx, but is poor in the vulcanization speed, and the heat resistance and compression set of the vulcanized products.

Japanese Patent Application Kokai (Laid-open) No. 59-20,310 discloses a process using a bromine compound represented by the general formula RBrx, wherein R represents a saturated aliphatic hydrocarbon group. Inventors of this prior art invention are partly common to those of the prior art invention disclosed in the said Japanese Patent Application Kokai (Laid-open) No. 53-125,491 and state that the fluorine-containing elastomers having bromine atoms are superior in the properties than the said fluorine-containing elastomers having iodine atoms. Indeed, the fluorine-containing elastomers having bromine have a better light stability, but are poor in the vulcanization speed and the heat resistance and compression set of the vulcanized products.

Japanese Patent Publication No. 54-1,585 discloses a process using a brominated olefin compound such as bromotrifluoroethylene, 4-bromo-3,3,4,4-tetrafluorobutene-1, etc., but the thus obtained fluorine-containing elastomers are liable to undergo gelation and are not only poor in the processability (flow characteristics), but also unsatisfactory in the elongation and compression set of the vulcanized products.

Japanese Patent Application Kokai (Laid-open) No. 60-195,113 discloses a process for copolymerizing not more than about 5% by mole, preferably 0.1 to 1.5% by mole, of a vinyl ether monomer acting as a curing site, represented by the general formula:

$$ROCX=CYZ$$

wherein one or two of X, Y and Z is selected from bromine and iodine atoms, the remainder being hydrogen, fluorine or chlorine atom, R is a linear or cyclic alkyl group, or alkenyl group or allyl group, but this prior art has the same disadvantages as in the art of the said Japanese Patent Publication No. 54-1,585.

Japanese Patent Application Kokai (Laid-open) No. 62-36,407 discloses a process for copolymerizing brominated fluorovinylether represented by the general formula:

$$CF_2Br(Rf)nOCF=CF_2$$

wherein Rf is a fluorinated alkylene group and n is 0 or 1, in the presence of a chain transfer agent represented by the general formula $R(CF_2BR)m$, wherein R is bromine, a containing perfluoroalkyl group or a bromine-containing alkylene group, and m is 1 or 2, where only a vulcanized product with a poor permanent set is obtained due to the cross-linking only by bromine.

As a result of extensive studies on a process for producing a peroxide-vulcanizable, fluorine-containing elastomer that can give a vulcanized product with distinguished processability, vulcanization characteristics and vulcanization physical properties, free from the problems encountered in the prior arts, the present inventors have previously found that the problems can be effectively solved by polymerizing a fluorine-containing olefin in the presence of an iodine and bromine-containing compound, thereby introducing and iodines and bromines into the fluorine-containing elastomer molecule as cross-linking points simultaneously (U.S. Pat. No. 4,748,223). Though the desired object was attained by the previous finding, the peroxide-vulcanized product of the fluorine-containing elastomer had a compression set of more than 30%, and thus a further improvement of the permanent set has been still desired.

As a result of further investigation of a process capable of solving such a new problem, the present inventors found that the problem was effectively dissolved by conducting the polymerization reaction in the simultaneous presence of the iodine and bromine-containing compound and a small amount of 1,1-difluoro-2-bromoethylene, and the resulting copolymerization of the 1,1-difluoro-2-bromoethylene (U.S. Pat. No. 4,943,622).

Thus, the present inventors succeeded in considerable improvement of the compression set of the fluorine-containing elastomers by using the iodine and bromine-containing compound that deemed to act as a chain transfer agent together with 1,1-difluoro-2-bromoethylene.

SUMMARY OF THE INVENTION

An object of the present invention is to provide a process for producing a peroxide-vulcanizable, fluorine-containing elastomer, which can give a vulcanized product having a distinguished compression set even without the secondary vulcanization.

DETAILED DESCRIPTION OF THE PREFERRED EMBODIMENTS

The object of the present invention can be attained by homopolymerizing or copolymerizing a fluorine-containing olefin having 2 to 8 carbon atoms in the presence of an iodine and bromine-containing compound represented by the general formula:

$$RBr_nI_m$$

wherein R is a fluorohydrocarbon group, a chlorofluorohydrocarbon group, a chlorohydrocarbon group or a hydrocarbon group, and n and m each are 1 or 2, and a perfluoro(vinylether) compound represented by the general formula:

$$CF_2=CFO[CF_2CF(CF_3)O]_m(CF_2)_nX$$

wherein X is a bromine atom or an iodine atom, and m and n each are 1, 2 or 3, thereby producing a fluorine-containing elastomer.

The perfluoro(vinylether) compound represented by the above-mentioned general formula, which can effectively improve the physical properties of the fluorine-containing elastomer through copolymerization into the copolymer molecular chain, can be synthesized through the following reaction steps:

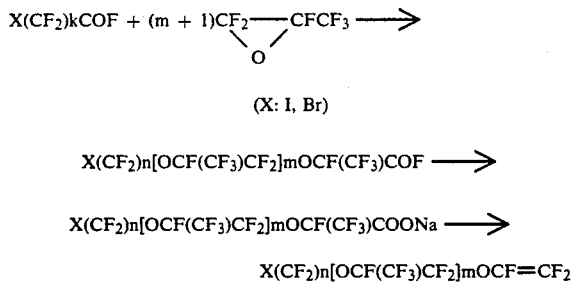

(X: I, Br)

$$X(CF_2)_n[OCF(CF_3)CF_2]_mOCF(CF_3)COF \longrightarrow$$

$$X(CF_2)_n[OCF(CF_3)CF_2]_mOCF(CF_3)COONa \longrightarrow$$

$$X(CF_2)_n[OCF(CF_3)CF_2]_mOCF=CF_2$$

wherein n=k+1, and m can be an arbitrary integer, depending on the amount of added hexafluoropropene oxide, but is preferably not more than 3 from the viewpoint of polymerization rate and copolymerization reaction ratio. The addition reaction of hexafluoropropene oxide as the first step is carried out with a catalyst such as cesium fluoride, etc. and a solvent such as diethyleneglycol dimethyl ether, etc. The second step is a conversion step of the acid fluoride to sodium carboxylate by using sodium carbonate, etc. in the same solvent as used in the first step, and the third step is a decarbonation reaction by heating also in the same solvent as used in the first step.

The perfluoro(vinylether) compound for use in the present invention can be synthesized through a series of the steps as mentioned above, but by-products from other synthesis processes can be directly and effectively utilized. That is, perfluoro(2-bromoethylvinylether) $Br(CF_2)_2OCF=CF_2$ has been so far used as a useful intermediate for the synthesis of various fluorine-containing compounds and its synthesis processes have been studied, among which a process for producing perfluoro(2-bromoethylvinylether) by subjecting bromoacetyl fluoride $BrCF_2COF$ to addition reaction with an equimolar amount of hexafluoropropene oxide, thereby obtaining an acid fluoride $Br(CF_2)_2OCF(CF_3)COF$, neutralizing the acid fluoride, thereby obtaining a carboxylate, and thermally decomposing the carboxylate has been found effective from the viewpoint of easy operation of the reaction, high yield, etc.

However, in the series of these synthesis steps, 2 or more moles of hexafluoropropene oxide can be added to one mole of bromoacetyl fluoride to inevitably by-produce about 10 to about 20% by mole of by-product acid fluoride represented by the following formula:

$$Br(CF_2)_2[OCF(CF_3)CF_2]_mOCF(CF_3)COF$$

wherein m is 1 to 2, on the basis of the first acid fluoride.

When the first acid fluoride $Br(CF_2)_2OCF(CF_3)COF$ containing such a by-product acid fluoride is led directly to perfluoro(2-bromoethylvinylether) without any purification, $Br(CF_2)_2[OCF(CF_3)CF_2]_mOCF=CF_2$ is derived from the by-product acid fluoride. In the present invention, the by-product perfluoro(vinylether) compound is effectively utilized.

These perfluoro(vinyl ether) compounds are used generally in an amount of about 0.001% to about 5% by mole, preferably about 0.01% to 3% by mole, on the basis of the fluorine-containing olefin. Below about 0.05% by mole, the effect on the improvement of the permanent set as aimed at in the present invention cannot be obtained, whereas above about 3% by mole the elongation of the vulcanized product is lowered.

The iodine and bromine-containing compound represented by the said general formula is selected from those which cannot lose the effects through side reactions under polymerization conditions, wherein R is selected from fluorohydrocarbon groups, chlorofluorohydrocarbon groups, chlorohydrocarbon groups or hydrocarbon groups generally having 1 to 10 carbon atoms, and each of the groups may have a functional group such as —O—, —S—, =NR, —COOH, —SO$_2$, —SO$_3$H, —PO$_3$H, etc.

Such iodine and bromine-containing compound may be a saturated or unsaturated linear or aromatic compound, wherein n and m each are preferably 1. The iodine and bromine-containing compound where at least one of n and m is 2 produces a fluorine-containing elastomer of three-dimensional structure, and thus is desirable to use within such a range as not to deteriorate the processability.

The linear iodine-containing bromine compound includes, for example, 1-bromo-2-iodoperfluoroethane, 1-bromo-3-iodoperfluoropropane, 1-bromo-4-iodoperfluorobutane, 2-bromo-3-iodoperfluorobutane, 1-bromo-2-iodoperfluoro(2-methylpropane), monobromomonoiodoperfluorocyclobutane, monobromomonoiodoperfluropentane, monobromomonoiodoperfluoro-n-octane, monobromomonoiodoperfluorocyclohexane, 1-bromo-1-iodo-2-chloroperfluoroethane, 1-bromo-2-iodo-2-chloroperfluoroethane, 1-iodo-2-bromo-2-chloroperfluoroethane, 1,1-dibromo-2-iodoperfluoroethane, 1,2-dibromo-2-iodoperfluoroethane, 1,2-diiodo-2-bromoperfluoroethane, 1-bromo-2-iodo-1,2,2-trifluoroethane, 1-iodo-2-bromo-1,2,2-trifluoroethane, 1-bromo-2-iodo-1,1-difluoroethane, 1-iodo-2-bromo-1,1-difluoroethane, 1-bromo-2-iodo-1-fluoroethane, 1-iodo-2-bromo-1-fluoroethane, 1-bromo-2-iodo-1,1,3,3,3-pentafluoropropane, 1-iodo-2-bromo-1,1,3,3,3-pentafluoropropane, 1-bromo-2-iodo-3,3,4,4,4-pentafluorobutane, 1-iodo-2-bromo-3,3,4,4,4-pentafluorobutane, 1,4-dibromo-2-iodoperfluorobutane, 2,4- dibromo-1-iodoperfluorobutane, 1,4-diiodo-2-bromoperfluorobutane, 1,4-dibromo-2-iodo-3,3,4,4,-tetrafluorobutane, 1,4-diiodo-2-bromo-3,3,4,4-tetrafluorobutane, 1,1-dibromo-2,4-diiodoperfluorobutane, 1-bromo-2-iodo-1-chloroethane, 1-iodo-2-bromo-1-chloroethane, 1-bromo-2-iodo-2-chloroethane, 1-bromo-2-iodo-1,1-dichloroethane, 1,3-dibromo-2-iodoperfluoropropane, 2,3-dibromo-2-iodoperfluoropropane, 1,3-diiodo-2-bromoperfluoropropane, 1-bromo-2-iodoethane, 1-bromo-2-iodopropane, 1-iodo-2-bromopropane, 1-bromo-2-iodobutane, 1-iodo-2-bromobutane, 1-bromo-2-iodo-2-trifluoromethyl-3,3,3-trifluoropropane, 1-iodo-2-bromo-2-trifluoromethyl-3,3,3-trifluoropropane, 1-bromo-2-iodo-2-phenylperfluoroethane, 1-iodo-2-bromo-2-phenylperfluoroethane, 3-bromo-4-iodoperfluorobutene-1, 3-iodo-4-bromoperfluorobutene-1, 1-bromo-4-iodoperfluorobutene-1, 1-iodo-4-bromoperfluorobutene-1, 3-bromo-4-iodo-3,4,4-trifluorobutene-1, 4-bromo-3-iodo-3,4,4-trifluorobutene-1, 3-bromo-4-iodo-1,1,2-trifluorobutene-1, 4-bromo-5-iodoperfluoro-pentene-1, 4-iodo-5-bromoperfluoro-pentene-1, 4-bromo-5-iodo-1,1,2-trifluoropentene-1, 4-iodo-5-bromo-1,1,2-trifluoropentene-1, 1-bromo-2-iodoperfluoroethyl perfluoromethyl ether, 1-bromo-2-iodoperfluoroethyl perfluoroethyl ether, 1-bromo-2-iodo-perfluoroethyl perfluoropropyl ether, 2-bromo-3-iodoperfluoro-propyl perfluorovinyl ether, 1-bromo-2-iodoperfluoroethyl perfluorovinyl ether, 1-bromo-2-iodoperfluoroethyl perfluoro-allyl ether, 1-bromo-2-iodoperfluoroethyl methyl ether, 1-iodo-2-bromoperfluoroethyl methyl ether, 1-iodo-2-bromoethyl ethyl ether, 1-bromo-2-iodoethyl-2'-chloroethyl ether, etc. These iodine and bromine-containing compounds can be prepared according to an appropriate, known process; for example, a monobromomonoiodo, fluorine-containing olefin can be obtained by allowing a fluorine-containing olefin to react with iodine bromide.

The aromatic, iodine and bromine-containing compound includes, for example, benzenes having a substituent group such as 1-iodo-2-bromo, 1-iodo-3-bromo, 1-iodo-4-bromo, 3,5-dibromo-1-iodo, 3,5-diiodo-1-bromo, 1-(2-iodoethyl)-4-(2-bromoethyl), 1-(2-iodoethyl)-3-(2-bromoethyl), 1-(2-iodoethyl)-4-(2-bromoethyl), 3,5-bis(2-bromoethyl)-1-(2-iodoethyl), 3,5-bis(2-iodoethyl)-1-(2-bromoethyl), 1-(3-iodopropyl)-2-(3-bromopropyl), 1-(3-iodopropyl)-3-(3-bromopropyl), 1-(3-iodopropyl)-4-(3-bromopropyl), 3,5-bis(3-bromopropyl)-1-(3-iodopropyl), 1-(4-iodobutyl)-3-(4-bromobutyl), 1-(4-iodobutyl)-4-(4-bromobutyl), 3,5-bis(4-iodobutyl)-1-(4-bromobutyl), 1-(2-iodoethyl)-3-(3-bromopropyl), 1-(3-iodopropyl)-3-(4-bromobutyl), 3,5-bis(3-bromopropyl)-1-(2-iodoethyl), 1-iodo-3-(2-bromoethyl), 1-iodo-3-(3-bromopropyl), 1,3-diiodo-5-(2-bromoethyl), 1,3-diiodo-5-(3-bromopropyl), 1-bromo-3-(2-iodoethyl), 1-bromo-3-(3-iodopropyl), 1,3-dibromo-5-(2-iodoethyl), 1,3-dibromo-5-(3-iodopropyl), etc., and perfluorobenzenes having a substituent group such as 1-iodo-2-bromo, 1-iodo-3-bromo, 1-iodo-4-bromo, 3,5-dibromo-1-iodo, 3,5-diiodo-1-bromo, etc.

During the polymerization reaction, the iodine and bromine of these iodine and bromine-containing compounds readily undergo radical cleavage under the action of an organic peroxide, radical-generating source, and the monomers undergo addition growth reaction owing to the high reactivity of the generated radicals, and then the reaction is discontinued by withdrawing the iodine and bromine from the iodine and bromine-containing compound to give a fluorine containing elastomer having iodine and bromine at the molecule terminals.

The iodine and bromine at the molecule terminals of the thus formed fluorine-containing elastomer readily undergo radical cleavage in the presence of a radical generating source, and the resulting polymer radicals have the similar reactivity. Thus, a segmented polymer corresponding to the species of polymerization monomers can be obtained by several runs of polymerization.

These iodine and bromine-containing compounds can generally give fluorine-containing elastomers capable of efficiently attaining cross-linking through bonding to the molecule terminals, and about 0.001 to about 5% by weight, preferably about 0.01 to about 3% by weight each of iodine and bromine must be contained in and bonded to in the resulting fluorine-containing elastomer. Below about 0.001% by weight, the cross-linking density of the fluorine-containing elastomer will be so low that no sufficient vulcanization can be obtained, whereas above 5% by weight, the rubber elasticity (elongation) and heat resistance of vulcanized product will become poor.

The fluorine-containing olefins for use in the polymerization according to the present invention preferably have 2 to 8 carbon atoms, for example, at least one of vinylidene fluoride, tetrafluoroethylene, hexafluoropropene, pentafluoropropene, chlorotrifluoroethylene, perfluoro(methylvinylether), perfluoro(ethylvinylether), perfluoro(propylvinylether), and perfluoro(propoxypropylvinylether) can be used. Besides, vinyl fluoride, trifluoroethylene, perfluorocyclobutene, perfluoro(methylcyclopropene), hexafluoroisobutene, 1,2,2-trifluoro-styrene, perfluorostyrene, etc. can be also used.

These fluorine-containing olefins can be also copolymerized with at least one of olefinic compounds having 2 to 6 carbon atoms and fluorine-containing dienes having 4 to 8 carbon atoms.

The olefinic compound has 2 to 6 carbon atoms and includes, for example, olefins such as ethylene, propylene, butene; unsaturated vinyl esters such as vinyl acetate, and alkylvinylethers such as methylvinylether, ethylvinylether, and is generally copolymerized in a proportion of about 0.1 to about 50% by mole as contained in the fluorine-containing elastomer.

The fluorine-containing diene has 4 to 8 carbon atoms, and includes, for example, perfluoro-1,3-butadiene, perfluoro-1,4-pentadiene, 1,1,2-trifluoro-1,3-butadiene, 1,1,2-trifluoro-1,4-pentadiene, 1,1,2,3,3-pentafluoro-1,4-pentadiene, perfluoro-1,7-octadiene, perfluorodivinyl ether, perfluorovinyl perfluoroallyl ether, vinyl perfluoroallyl ether, perfluorovinyl vinyl ether, etc. It is preferable that the fluorine-containing diene is copolymerized in a proportion of not more than about 1% by mole, as contained in the fluorine-containing elastomer. When copolymerized in a proportion above about 1% by mole, the copolymer elastomer undergoes considerable gelation, deteriorating the processability (flow characteris-tics) and the elongation of the vulcanized products.

Specific examples of the fluorine-containing olefin copolymer include hexafluoropropene-vinylidene fluoride copolymer, hexafluoropropene-vinylidene fluoride-tetrafluoroethylene terpolymer, tetrafluoroethylene-vinylidene fluorideperfluoro(methylvinylether) terpolymer, tetrafluoroethylenevinylidene fluoride-perfluoro(propylvinylether) terpolymer, tetrafluoroethylene-perfluoro(propoxypropylvinylether) copolymer, tetrafluoroethylene perfluoro(methylvinylether) copolymer, tetrafluoroethylene-propylene copolymer, tetrafluoroethylene-vinylidene fluoride-hexafluoropropene-pentafluoropropene quaternary polymer, tetrafluoroethylene-hexafluoropropene-vinyl fluoride-perfluoro(methylvinylether) quaternary polymer, tetrafluoroethylene-hexafluoropropene-hexafluoroisobutene terpolymer, tetrafluoroethylene-cychohexyl vinyl ether copolymer, hexafluoropropene-vinylidene fluoride-chlorotrifluoroethylene terpolymer, vinylidene fluoride-tetrafluoroethylene-methyl perfluorovinyl ether terpolymer, vinylidene fluoride-tetrafluoroethylene-n-butyl perfluorovinyl ether terpolymer, vinylidene fluoride-methyl perfluorovinyl ether-perfluoro(methylvinylether) terpolymer, tetrafluoroethylene-methyl perfluorovinyl ether-perfluoro(methylvinyl ether) terpolymer, vinylidene fluoride-hexafluoropropene-tetrafluoroethylene-methyl perfluorovinyl ether quaternary copolymer, tetrafluoroethylene-n-butyl perfluorovinyl etherperfluoro(methylvinylether) terpolymer, vinyliden fluoride-n-butyl perfluorovinyl ether copolymer, tetrafluoroethylenepropylene-n-butyl perfluorovinyl ether terpolymer, tetrafluoroethylene-vinylidene fluoride-propylene-n-butyl perfluorovinyl ether quaternary polymer, etc.

The polymerization reaction of the fluorine-containing olefin or the fluorine-containing olefin and the comonomer is carried out in the presence of an iodine and bromine-containing compound and perfluoro(vinyl ether) compound according to a so far well known procedure through solution polymerization, suspension polymerization or emulsion polymerization.

In case of the solution polymerization, the polymerization reaction is carried out in a polymerization solvent of less chain transferability, such as perfluoro(1,2-dimethylcyclobutane), perfluoro(1,2-dichloroethane), perfluoro(1,2,2-trichloroethane), perfluorocyclohexane, perfluorotributylamine, α, ω-dihydroperfluoropolymethylene, perfluoro(methoxypolyethoxyethane), perfluorocyclobutane, tert-butanol, etc., using a polymerization initiator such as fluorine-containing organic peroxides, organic azo compounds, fluorine-containing organic azo compounds, etc. or these polymerization initiators as in a redox system in combination with a reducing agent, for example, an organo-metal compound such as triethylaluminum, triethylboron, diethylzinc, etc., a tertiary amine, mercaptanes, etc.

In case of the suspension polymerization, polymerization reaction is carried out while dispersing the monomer in water, using a polymerization initiator such as organic peroxides, fluorine-containing organic azo compounds, etc. (directly or in a solution in a solvent such as trifluorotrichloroethane, methyl chloroform, dichlorotetrafluoroethane, difluorotetrachloroethane, etc.) or these polymerization initiators as in a redox system in combination with a reducing agent, for example, an organometal compound such as triethylaluminum, triethylboron, diethylzinc, etc., a tertiary amine, mercaptane, etc.

In case of the emulsion polymerization reaction, a water-soluble polymerization initiator such as an inorganic peroxide, for example, persulfate, hydrogen peroxide, perchlorate, etc., and an organic peroxide such as tert-butyl hydroperoxide, disuccinyl peroxide, etc. is used. These polymerization initiators can be also used as a redox system using a reducing agent such as sulfite, hyposulfite, ascorbic acid, ferrous salts, sodium hydroxymethanosulfinate, etc. together.

The molecular weight of the fluorine-containing elastomer can be adjusted with a chain transfer agent such as methanol, ethanol, isopentane, ethyl acetate, diethyl malonate, carbon tetrachloride, etc. Furthermore, in order to attain the stable dispersion of polymer particles in a polymerization solution, as increase in the polymer concentration, prevention of polymers from deposition onto the polymerization reactor wall, etc., an emulsifier such as fluorine-containing carboxylates, fluorine-containing sulfonates, etc. can be also used.

These various types of polymerization reaction are carried out in such a temperature that no depolymerization of the thus formed polymer takes place as a result of progress of radical reaction, generally at a temperature of $-30°$ to $150°$ C. However, in case of the redox system, the polymerization reaction takes place at a temperature of $0°$ to $50°$ C. By carrying the polymerization reaction in such a range of low temperature, thermal decomposition of the iodine and bromine-containing compound can be suppressed, and the cross-linking density of the vulcanized product can be increased.

The polymerization pressure is not particularly limited, and a broad pressure range can be used in accordance with desired rate and degree of polymerization, but generally the polymerization is carried out in a range of about 1 to about 100 $kgf/cm^2$.

The fluorine-containing elastomer obtained according to the present invention can be cured according to various known vulcanization methods, for example, by peroxide vulcanization using an organic peroxide, by polyamine vulcanization using a polyamine compound, by polyol vulcanization using a polyhydroxy compound, or by irradiation of radiations, electron beams, etc. Above all, the elastomer cured by peroxide vulcanization can have a higher mechanical strength and a carbon-carbon bonds of stable structure at the cross-linking points. That is, the peroxide vulcanization can give vulcanized products having distinguished chemical resistance, solvent resistance, etc. and thus is particularly preferable.

The organic peroxide for use in the peroxide vulcanization includes, for example, 2,5-dimethyl-2,5-bis(tert-butylperoxy)hexane, 2,5-dimethyl-2,5-bis(tert-butylperoxy)hexine-3, benzoyl peroxide, bis(2,4-dichlorobenzoyl) peroxide, dicumyl peroxide, di-tert-butyl peroxide, tert-butyl cumyl peroxide, tert-butylperoxybenzene, 1,1-bis(tert-butylperoxy)-3,5,5-trimethyl cyclohexane, 2,5-dimethylhexane-2,5-dihydroxyperoxide, α,ω'-bis(tert-butylperoxy)-p-diisopropylbenzene, 2,5-dimethyl-2,5-di(benzoylperoxy)hexane, tert-butylperoxy isopropyl carbonate etc.

In the peroxide vulcanization using the organic peroxide, a polyfunctional, unsaturated compound, such as tri(meth)allyl isocyanulate, tri(meth)allyl cyanulate, triallyl trimellitate, N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. can be usually used as a co-cross-linking agent to obtain more distinguished vulcanization characteristics, mechanical strength and compression set.

An oxide or hydroxide of divalent metal, such as oxides or hydroxides of calcium, mangnesium, lead, zinc, etc. can be used as a cross-linking aid, depending upon the desired purpose. These compounds also act as acid acceptor.

The foregoing components for the peroxide vulcanization system are used in the following proportion. About 0.1 to about 10 parts by weight, preferably about 0.5 to about 5 parts by weight, of the organic peroxide; about 0.1 to about 10 parts by weight, preferably about 0.5 to about 5 parts by weight, of the co-crosslinking agent; and not more than about 15 parts by weight of the crosslinking aid are used on the basis of 100 parts by weight of the fluorine-containing elastomer.

The foregoing components for the peroxide vulcanization can be blended and kneaded into the fluorine-containing elastomer directly as such or after diluted with carbon black, silica, clay, talc, diatomaceous earth, barium sulfate, etc., or as a master dispersion with the fluorine-containing elastomer. In addition to the foregoing components, so far well known filler, reinforcing agent, plasticize lubricant, processing aid, pigment, etc. can be appropriately added to the blend.

The present fluorine-containing elastomer can be also blended and co-crosslinked with other peroxide-crosslinking substances such as silicone oil, silicone rubber, fluorosilicone rubber, fluorophospahzene rubber, ethylene-vinyl acetate copolymer, ethylene-acrylate copolymer, ethylene-propylene(-diene) copolymer rubber, acrylonitrile-butadiene copolymer rubber, acrylate rubber, etc.

Vulcanization can be carried out by heating after the said components have been blended according to an ordinary blending method, for example, by roll mixing, by kneader mixing, by Banbury mixing, by solution mixing, etc. The heating is carried out generally in two steps or one step, i.e. by primary vulcanization at about 100° to about 250° C. for about 1 to about 120 minutes and by secondary vulcanization at about 150° to about 300° C. for 0 to 30 hours.

The fluorine-containing elastomer obtained in the present invention can give a vulcanized product having a good permanent set even only primary vulcanization. Furthermore, the perfluoro(vinylether) compound for use in the present invention includes a by-product obtained by other synthesis processes, and the by-product can be effectively utilized in the present invention.

PREFERRED EMBODIMENTS OF THE INVENTION

The present invention will be described in detail below, referring to Examples and comparative example.

REFERENCE EXAMPLE 6.0 g of cesium fluoride and 90 g of diethyleneglycol dimethylether were charged into an autoclave having a capacity of 500 ml, and stirred, and 56 g of $BrCF_2COF$ and then 116 g of hexafluoropropene oxide were introduced into the autoclave under pressure. The autoclave was continuously stirred overnight. After the end of reaction, 120 g of an acid fluoride of the following formula having a purity of about 80% was obtained:

$$Br(CF_2)_2[OCF(CF_3)CF_2]OCF(CF_3)COF$$

Then, the acid fluoride was slowly added dropwise with stirring into a flask containing 70 g of sodium carbonate and 100 g of diethyleneglycol dimethylether, thereby converting the acid fluoride to a sodium carboxylate, and then the mixture was heated to 120° C. to conduct decarbonation reaction. The resulting crude product having a purity of 75% by weight was fractionated whereby 42 g of perfluoro(vinylether) compound of the following formula having a boiling point of 98° to 105° C. was obtained:

EXAMPLE 1

3,660 g of deionized water, 15.4 g of ammonium perfluorooctanoate, 2.2 g of NaOH and 11.0 g of $Na_2HPO_4 \cdot 12H_2O$ were charged into an autoclave having a capacity of 10 liters, and then the autoclave was flushed with a nitrogen gas and degasified under reduced pressure.

Then, the following compounds were charged into the autoclave:

| | |
|---|---|
| $BrCF_2CF_2I$ | 6.7 g |
| $CF_2=CFOCF_2CF(CF_3)O(CF_2)_2Br$ | 18.6 g | and then the following monomers were charged into the autoclave:

| | | |
|---|---|---|
| $CF_3OCF=CF_2$ | [FMVE] | 603 g |
| $CF_2=CF_2$ | [TFE] | 332 g |
| $CH_2=CF_2$ | [VdF] | 782 g |

Then, the autoclave was stirred and the temperature was elevated to 50° C. Then, 1.46 g of ammonium persulfate was added thereto to start polymerization reaction. The reaction was continued for 17.5 hours, and upon confirmation if no more pressure reduction took place, the internal remaining pressure was discharged from the autoclave to discontinue the polymerization reaction. The resulting latex was salted out with an aqueous 5% sodium chloride solution and dried, whereby 1,640 g of white, fluorine-containing elastomer copolymer (TFE: 18 mol. %/VdF: 59 mol. %/FMVE: 23 mol. %) was obtained.

EXAMPLES 2 to 4

The following perfluoro(vinylether) compounds were used in place of $CF_2=CFOCF_2CF(CF_3)O(CF_2)_2Br$ in EXAMPLE 1.

| Ex. No. | perfluoro(vinylether) compound | | product copolymer |
|---|---|---|---|
| 2 | $CF_2=CFO[CF_2CF(CF_3)O]_2(CF_2)_2Br$ | 25.5 g | 1620 g |
| 3 | $CF_2=CFOCF_2CF(CF_3)O(CF_2)_3Br$ | 17.1 g | 1680 g |
| 4 | $CF_2=CFOCF_2CF(CF_3)O(CF_2)_2I$ | 20.4 g | 1540 g |

COMPARATIVE EXAMPLE

No $CF_2=CFOCF_2CF(CF_3)O(CF_2)_2Br$ was used in EXAMPLE 1.

100 parts by weight of the fluorine-containing elastomers obtained in the foregoing Examples and Comparative Example were each kneaded with 20 parts by weight of MT carbon black, 3 parts by weight of 2,5-dimethyl-2,5-di(t-butylperoxy)hexane (concentration: 40% by weight), 3 parts by weight of lead oxide and 4 parts by weight of triallyl isocyanurate in rolls, and the resulting blends were each press-vulcanized at 180° C. for 10 minutes and molded into a sheet form or an O-ring form (P-24). Portions of these molded products were further subjected to secondary vulcanization at 220° C. for 22 hours.

The secondary vulcanization products were subjected to measurement of normal state physical properties, permanent set (20% compression at 200° C. for 70 hours) and heated aging resistance (changes in physical properties after 72 hours at 230° C.), and the results are shown in the following TABLE, together with the permanent set of primary vulcanization products.

TABLE

| Measurement item | Ex. 1 | Ex. 2 | Ex. 3 | Ex. 4 | Comp. Ex. |
|---|---|---|---|---|---|
| [Normal state physical properties] | | | | | |
| Hardness (JIS-A) | 71 | 70 | 72 | 73 | 69 |
| 100% modulus (kgf/cm$^2$) | 52 | 50 | 55 | 59 | 47 |
| Tensile strength (kgf/cm$^2$) | 225 | 215 | 242 | 206 | 209 |
| Elongation (%) | 301 | 329 | 325 | 282 | 325 |
| [Permanent set] | | | | | |
| Primary vulcanization product (%) | 28 | 29 | 26 | 31 | 45 |
| Secondary vulcanization product (%) | 26 | 28 | 22 | 29 | 34 |
| [Heated aging resistance] | | | | | |
| Hardness change (pts) | 0 | +1 | +1 | −1 | +1 |
| Tensile strength change (%) | −7 | −9 | −7 | −18 | −21 |
| Elongation change (%) | +8 | +12 | +10 | +29 | +32 |

What is claimed is:

1. A process for producing a peroxide-vulcanizable fluorine-containing elastomer, which comprises homopolymerizing or copolymerizing a fluorine-containing olefin having 2 to 8 carbon atoms in the presence of an iodine and bromine-containing compound represented by the general formula:

RBrnIm wherein R is a fluorohydrocarbon group, a chlorofluoro-hydrocarbon group, a chlorohydrocarbon group or a hydrocarbon group, and n and m each are 1 or 2, and a perfluoro(vinylether) compound represented by the general formula:

CF$_2$=CFO[CF$_2$CF(CF$_3$)O]m(CF$_2$)nX wherein X is a bromine atom or an iodine atom and m and n each are 1, 2 or 3.

2. A process according to claim 1, wherein the iodine and bromine-containing compound is used in an amount of about 0.001% to about 5% by weight in terms of iodine and bromine to be combined in the fluorine-containing elastomer.

3. A process according to claim 1, wherein the perfluoro(vinylether) compound is used in a ratio about 0.001% to about 5% by mole to the fluorine-containing olefin.

4. A process according to claim 1, wherein the homopolymerizing or copolymerizing is carried out at a temperature of about −30° C. to about 150° C. in the presence of a polymerization initiator.

* * * * *

UNITED STATES PATENT AND TRADEMARK OFFICE
CERTIFICATE OF CORRECTION

PATENT NO. : 5,225,504
DATED : July 6, 1993
INVENTOR(S) : Tatsu, et. al.

It is certified that error appears in the above-indentified patent and that said Letters Patent is hereby corrected as shown below:

On the Title page, item [73], Assignee: should read --NIPPON MEKTRON, TOKYO, JAPAN --.

Signed and Sealed this

Twenty-eighth Day of June, 1994

Attest:

BRUCE LEHMAN

Attesting Officer         Commissioner of Patents and Trademarks